June 14, 1949.  B. S. HUGHES  2,473,488
VORTICAL CURRENT SEPARATOR

Filed June 16, 1945  2 Sheets-Sheet 1

Inventor,
Burton S. Hughes,
by Walter P. Guyer
Attorney.

June 14, 1949. B. S. HUGHES 2,473,488
VORTICAL CURRENT SEPARATOR
Filed June 16, 1945 2 Sheets-Sheet 2

Inventor,
Burton S. Hughes,
by Walter P. Guyer
Attorney.

Patented June 14, 1949

2,473,488

UNITED STATES PATENT OFFICE 2,473,488

VORTICAL CURRENT SEPARATOR

Burton S. Hughes, Buffalo, N. Y., assignor to Zaremba Company, Buffalo, N. Y., a corporation of Maine Application June 16, 1945, Serial No. 599,924

4 Claims. (Cl. 209—211)

This invention relates generally to evaporators but more particularly to certain new and useful improvements in evaporators for crystallizing sodium chloride and other materials where size of the crystals is important.

Its primary object is to provide an evaporator of this character which is designed for large scale operations and maximum capacities and so constructed as to effectually separate the larger salt crystals from the smaller crystals and thus avoid returning to the evaporator the fine salt crystals rejected by the screens.

Another object of the invention is the provision of means for continuously circulating the brine through the evaporator and a classifier associated therewith and at such a rate as to carry the smaller crystals upwardly while permitting the larger crystals to fall by gravity against the ascending circulating currents into the discharge provided therefor.

A further object is to so combine and correlate the classifier and the evaporator as to effect the making of the salt crystals of the required grain size, and to provide a unitary pump means to maintain proper circulation of the slurry through the evaporator and the classifier.

Other features of the invention reside in the construction and arrangement of parts hereinafter described and particularly pointed out in the appended claims.

Figures 1, 4:
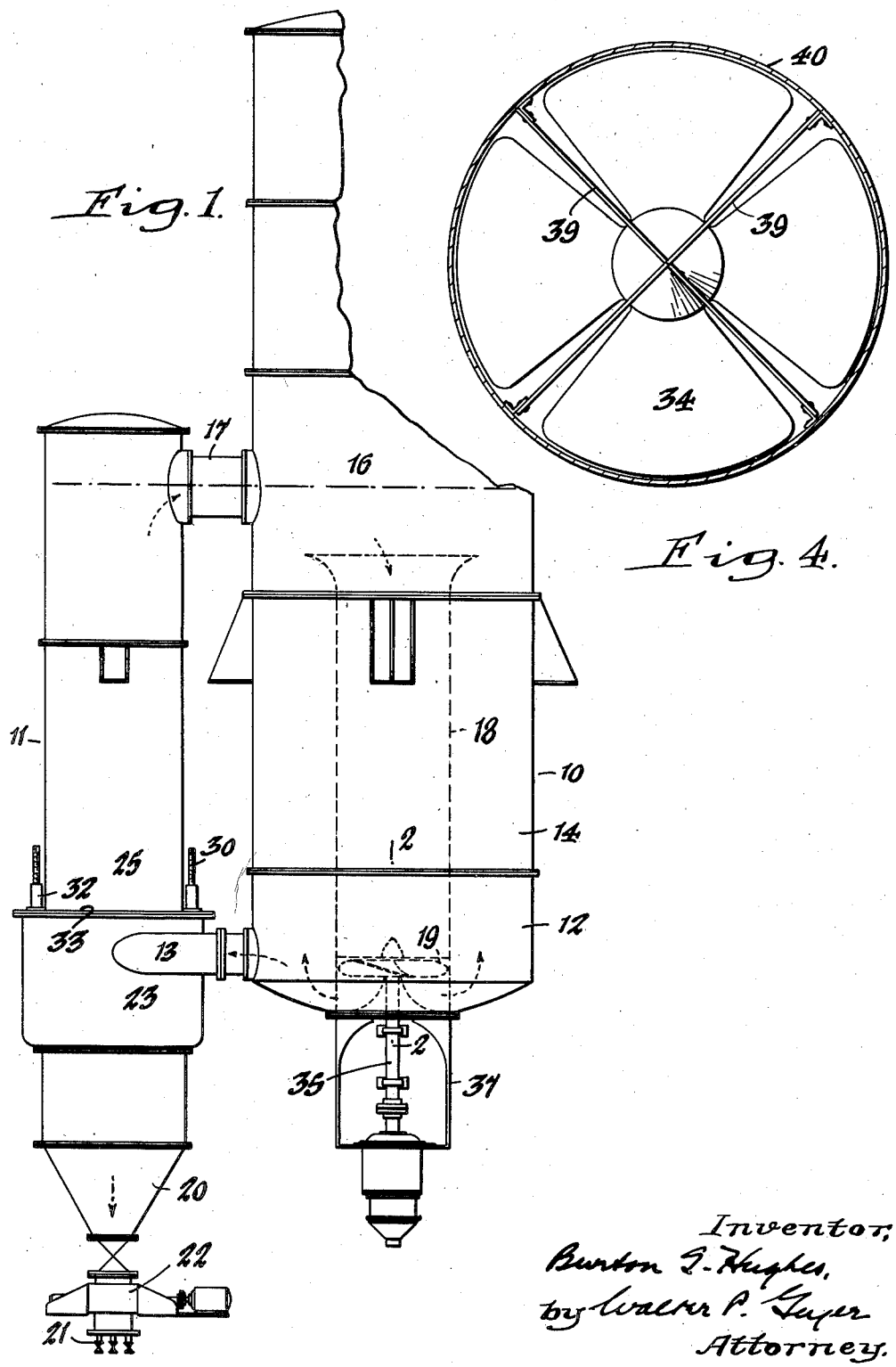
Figure 2:
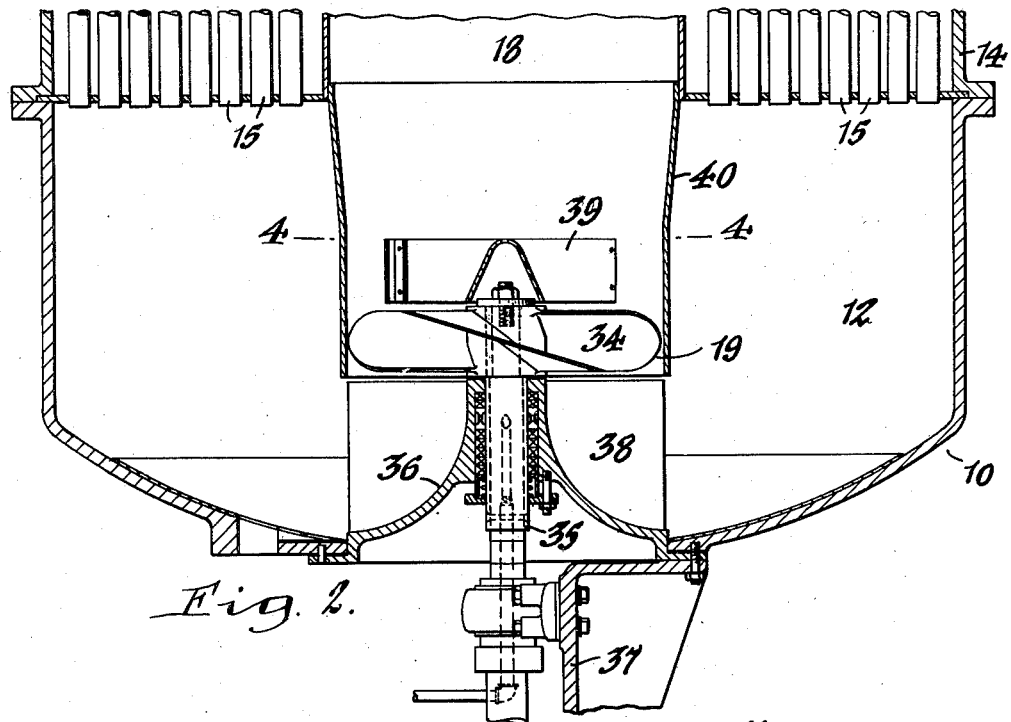
Figure 3:
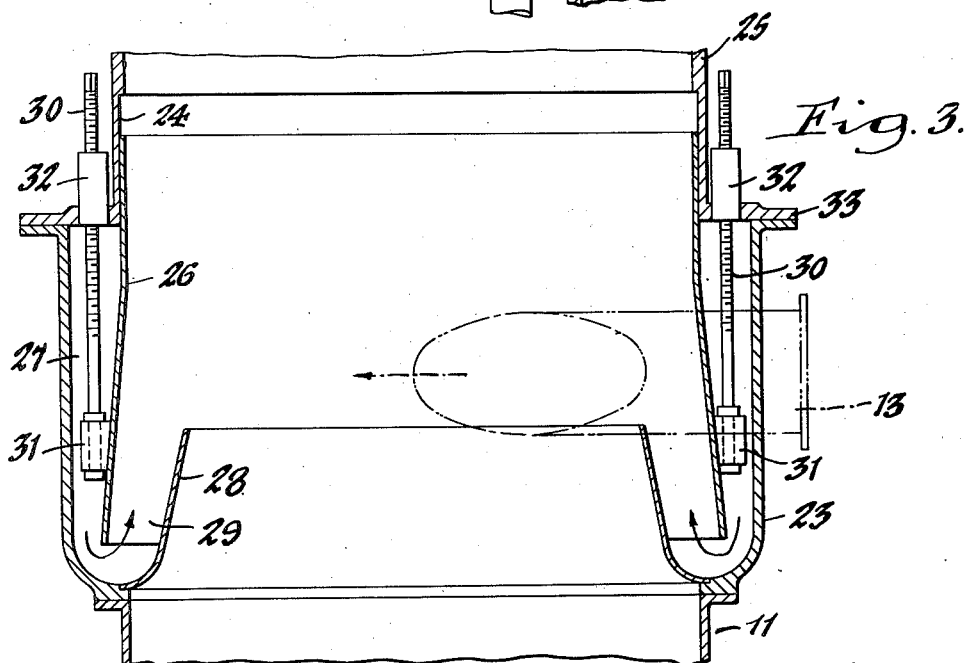

In the accompanying drawings:

Figure 1 is a fragmentary side elevation of the combined evaporator and classifier embodying my invention. Figure 2 is an enlarged transverse vertical section taken on line 2—2, Figure 1. Figure 3 is an enlarged fragmentary vertical section taken through the chambered section of the classifier. Figure 4 is an enlarged horizontal section taken on line 4—4, Figure 2.

Similar characters of reference indicate corresponding parts throughout the several views.

The apparatus constituting my invention pertains more particularly to the arrangement, construction and operation of a classifier or salt separating unit combined with an evaporator or effect, whether used as a single unit or in multiple effect. For the sake of convenience and to avoid unnecessary duplication, only a single system or effect is illustrated in the drawings, the numeral 10 indicating the evaporator and 11 the classifier.

The evaporator 10 is of the usual cylindrical type for making salt and comprises a lower compartment or chamber 12 from which the slurry is directed to the lower portion of the classifier 11 through a pipe 13 tangentially connected thereto, a central compartment or steam chest 14 to heat the solution having vertical tubes 15 therein through which the brine is circulated upwardly, and an upper chamber or compartment 16 connected by a pipe 17 with the upper end of the classifier for the recirculation of the slurry from the latter to the upper portion of the evaporator. A downtake tube 18 extends centrally through the steam chest 14 and opens at its lower end into the lower evaporator-chamber 12 and at its flared upper or mouth end into the upper chamber 16. A screw pump 19 of any well known construction is mounted in the lower end of the downtake tube for continuously forcing circulation of the brine upwardly through the tubes 15 and returning it downwardly through the downtake. The brine level is maintained approximately four feet above the upper tube sheet of the steam chest to prevent boiling of the brine in the tubes and to insure free flow of the brine into the flared mouth of the tube 18 for return to the pump. As the solution is circulated upwardly through the tubes 15 by the pump, it is heated and as the brine nears the brine level boiling occurs, thus concentrating the solution and making salt by the addition to the small crystals carried in the circulated solution. At all times the evaporator contains a slurry consisting of 94% to 95% of saturated brine and 5% to 6% of salt crystals. This provides the condition required for producing salt of the crystal size desired.

The classifier 11, which consists of a sectional cylindrical vessel, is disposed alongside the evaporator 10 in a vertical position in the manner shown in Figure 1, and functions to separate the large salt crystals from the smaller ones by continuously circulating the slurry upwardly through the classifier from the bottom of the evaporator and causing it to reenter the top of the latter from the top of the former. The circulation upwardly through the classifier is at such a rate as to carry salt crystals smaller then desired, while permitting the larger crystals to fall by gravity against the ascending current and dropping into the conical section 20 provided at the bottom of the classifier. The large-grained salt, which settles into the conical section, is discharged as a heavy slurry through nozzles 21. Inasmuch as lumps and scales continuously form in salt evaporators, a lump grinder 22 of any suitable construction is disposed between the conical section 20 and the nozzles to reduce any such lumps or scales to a size which will not obstruct the nozzles.

In its preferred construction shown in the drawings, the classifier has an enlarged cylindrical section 23 adjacent its lower end, and above the conical discharge section 20 thereof, into the upper portion of which the slurry from the evaporator is delivered in tangential fashion through the connecting pipe 13. In this connection, while most of the brine in the evaporator is circulated within the same by the pump 19, a small portion of it is caused to be circulated by the latter into the classifier and utilizing the head required to force the brine upwardly through the tubes 15 of the evaporator. Disposed within the enlarged classifier-section 23 and guided in telescopic fashion on the inner wall of the lower portion 24 of the adjoining section 25 of the classifier body is an axially or vertically adjustable sleeve or cylindrical partition 26 whose lower portion is slightly flared, as shown, and which is spaced from the surrounding wall of such enlarged section and terminates above the bottom thereof to provide an annular chamber 27 closed at its top and open at its bottom and into which the slurry is tangentially delivered. Upon entering this chamber in a tangential fashion through the pipe 13 from the evaporator, the slurry is rotated therein at a rate which will prevent any of the salt settling out. The bottom of the enlarged classifier-section 23 terminates in an upwardly and inwardly directed annular flange or sleeve 28 which is spaced inwardly and concentrically from the adjoining lower portion of the sleeve 26 to provide a space 29 for the upward passage of the slurry into the central portion of the classifier, the connecting walls of such section and flange being joined in curvilinear fashion, as shown in Figure 3, to facilitate the direction of flow of the slurry upwardly and inwardly. These parts are so arranged and proportioned that the slurry will be delivered into the central portion of the classifier with a very slight rotary motion and without creating whirls or eddies, the chamber 27 and communicating space 29 jointly forming a solution-circulating area substantially U-shaped in cross section. The mixture then passes upwardly in the classifier at the velocity required to carry the small salt grains therewith and allowing the larger ones to gravitate to the bottom and be discharged.

The velocity of the upward flow of the slurry in the classifier is regulated by adjusting the sleeve 26 upwardly or downwardly to accordingly increase or decrease the area for its flow from the annular chamber 27 into the space 29. For this purpose, upright bolts 30 are provided which are swivelly supported at their lower ends in ears 31 applied to the adjustable sleeve, while their upper ends engage internally-threaded collars 32 applied to the attaching flange 33 of the section 25 of the classifier, and which flange forms a closure for the top of the annular chamber 27. By turning these bolts in one direction or the other, the sleeve 26 is adjusted up or down and the adjustments may be made while the apparatus is in operation.

As shown in Figures 2 and 4, the screw pump 19 comprises a propeller 34 applied to the upper end of a drive shaft 35 journaled at its upper end in a detachable closure member 36 applied to the bottom of the evaporator 10 and at its lower end in a bracket 37 depending from such member. Radial vanes 38 applied to the closure member below the propeller and similar vanes 39 applied to the lower inner wall or section 40 of the downtake tube 18 immediately above the propeller serve to cause the solution to flow into and out of the pump in an axial direction without rotation, and at the same time increase the capacity and efficiency of the pump.

I claim as my invention:

1. A classifier of the character described, comprising a vessel including a cylindrical section interposed therein and composed of inner and outer sleeve-like members disposed axially of the vessel and in spaced concentric relation to each other, the outer member being secured at its upper and lower ends to the opposing ends of the vessel and terminating at its lower end in an inwardly and upwardly directed annular flange spaced about the lower portion of the companion inner member to jointly provide therewith and with said outer section member an annular chamber substantially U-shaped in cross section, the outer portion of such chamber being closed at its top and having an intake for delivering the solution thereto in a tangential direction and the inner portion thereof opening upwardly into the vessel.

2. A classifier of the character described, comprising a vessel including a cylindrical section interposed therein and composed of inner and outer sleeve-like members disposed axially of the vessel and in spaced concentric relation to each other, the outer member terminating at its lower end in an inwardly and upwardly-directed annular flange spaced about the lower portion of the companion inner member to jointly provide therewith an annular chamber substantially U-shaped in cross section, the outer portion of such chamber being closed at its top and having an intake for delivering the solution thereto in a tangential direction and the inner portion thereof opening upwardly into the vessel, the outer sleeve-like member being secured at its upper and lower ends to the opposing ends of the vessel and the companion inner member being guided at its upper end on the opposing end of said vessel for axial adjustment relative thereto to regulate the area of flow of the solution from the outer to the inner portions of said chamber, and means operatively connected to said inner member for effecting its adjustment.

3. Apparatus of the character described, comprising a vertically-disposed vessel adapted for circulating communication with an evaporator and having an outlet at its upper end and including a cylindrical section interposed therein adjacent its lower end having an inlet for delivering the solution to be treated thereto in a tangential direction, and means extending into said cylindrical section and in spaced concentric relation thereto to define therewith an annular chamber substantially U-shaped in cross section, the outer portion of such chamber receiving the solution from said inlet and being closed at its top and the inner portion of such chamber opening upwardly into said vessel.

4. Apparatus of the character described, comprising a vertically-disposed vessel adapted for circulating communication with an evaporator and having an outlet at its upper end and including a cylindrical section interposed therein adjacent its lower end having an inlet for delivering the solution to be treated thereto in a tangential direction, said cylindrical section having an inwardly spaced and upwardly directed annular flange at its lower end, and a sleeve like member suspended from said vessel and extending at its lower end into the space between said section and its flange to provide therewith a substantially U-shaped chamber whose outer portion is closed at its top and whose inner portion opens upwardly into said vessel.

BURTON S. HUGHES.

REFERENCES CITED

The following references are of record in the file of this patent:

UNITED STATES PATENTS

| Number | Name | Date |
|---|---|---|
| 1,791,281 | Morse | Feb. 3, 1931 |
| 1,869,093 | Crewson | July 26, 1932 |
| 1,939,710 | Lissman | Dec. 19, 1933 |
| 1,972,730 | Connell | Sept. 4, 1934 |
| 1,978,802 | Lissman | Oct. 20, 1934 |
| 2,008,643 | Lockett | July 16, 1935 |
| 2,033,985 | Haney | Mar. 17, 1936 |
| 2,102,525 | Freeman | Dec. 14, 1937 |
| 2,156,483 | Sallee | May 2, 1939 |
| 2,330,423 | Hart | Sept. 28, 1943 |
| 2,384,747 | Hughes | Sept. 11, 1945 |